Oct. 27, 1953 A. T. STARR ET AL 2,657,269

ELECTRIC PULSE MODULATION SYSTEM OF COMMUNICATION

Filed Dec. 30, 1947

INVENTOR
A. T. STARR –
H. GRAYSON

BY Philip M. Bolton
ATTORNEY

Patented Oct. 27, 1953 2,657,269

UNITED STATES PATENT OFFICE 2,657,269

ELECTRIC PULSE MODULATION SYSTEM OF COMMUNICATION

Arthur Tisso Starr and Harry Grayson, London, England, assignors to International Standard Electric Corporation, New York, N. Y., a corporation of New York Application December 30, 1947, Serial No. 794,616
In Great Britain January 2, 1947

3 Claims. (Cl. 179—15)

Figures 1, 2:
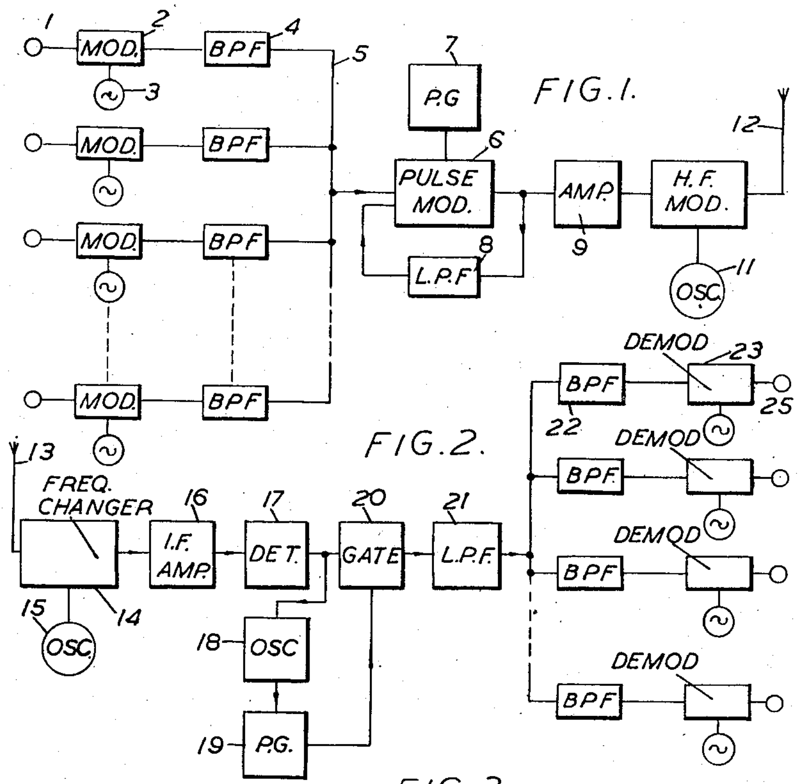

The present invention relates to electric pulse modulation systems of communication and involves a new method of employing pulses for conveying signals.

The invention has its application mainly to multi-channel communication systems having a very large number of channels, and consequently occupying a very wide frequency band; but the same principles could be employed in the case of systems having a few channels, or even only one.

In pulse communication systems it has usually been the practice hitherto to provide a separate train of pulses for each channel, and to modulate some characteristic of the train in accordance with the signal. Such a characteristic may be the amplitude, or the duration, or the timing of the pulses, for example. It is also the general, though not universal, practice to arrange for the pulse repetition frequency to be the same for all the channel pulse trains, and to transmit all these trains interleaved in time in the form of a combined pulse train in which, during each separate signalling period, the successive pulses belong to different channels. One of these pulse trains may be given an identifying characteristic by means of which it may be separated from the other pulse trains at the receiver and used for synchronising the reception of the other pulse trains.

This usual method of employing the pulses to convey the intelligence becomes difficult to handle when there are large numbers of channels. If for example, there are 200 speech channels, each channel will require at least 10,000 pulses per second to produce satisfactory reproduction of the speech, and so the total number of pulses required per second will be about 2 million. In a time-phase modulation system the duration of the pulses would therefore need to be a very small fraction of a microsecond if cross talk is to to be avoided, and the difficulty of controlling the time constants of the systems, and also the distortion suffered by the pulses during transmission over the communication medium, therefore becomes practically insurmountable.

The present invention proposes an entirely different method of employing the pulses. In an embodiment which will be described in detail the first step in the process is to arrange so that the various signal channels occupy a corresponding number of frequency bands, which together make up a broad composite band. This is done by well known amplitude modulation processes. The composite band is then treated as a single composite signal channel which is to be conveyed by the pulses. At the transmitting end, a master pulse generator is provided, the frequency of which should be closely stabilised by means of a piezo electric crystal (or by other suitable means). Assuming that there are 200 channels to be conveyed, and that the composite band extends from 60 to 800 kilocycles per second, the master pulse generator should preferably produce about 4 million regularly repeated pulses per second, each having a duration of perhaps $\frac{1}{10}$ or $\frac{1}{15}$ microsecond. These pulses are supplied to a pulse number modulator to which the composite signal is also applied. The modulator is of type in which the pulse duration, amplitude, and timing are all unaffected by the signal, but instead, a varying proportion of the pulses are suppressed altogether, this proportion being controlled by the variation in the amplitude of the composite signal. In other words, the number or density of the pulses in the transmitted pulse train depends on the signal amplitude.

The number or density modulated pulse train is then transmitted to receiver by modulation of an ultra high frequency radio carrier wave, or in any other suitable way, and is then recovered by a conventional demodulation process. The recovered pulse train is applied to a narrow band pass filter which selects therefrom a synchronising wave whose frequency is equal to the fundamental repetition frequency of the pulses (4 million cycles per second). This synchronising wave is employed to synchronise a master pulse generator similar to the one at the transmitter, and designed to supply 4 million master pulses per second, such pulses having a duration somewhat shorter than that of the pulses generated at the transmitting end, for example about $\frac{1}{20}$ microsecond. The received pulses are applied to control a gating circuit of conventional type, to which also are applied the master pulses from the master pulse generator. The arrangement is such that a master pulse is allowed to pass through the gating circuit only when a corresponding received pulse is present. It follows that a density modulated train of master pulses will be obtained at the output of the gating circuit, which train contains all the signal modulation of the transmitted train, but with all the distortion and noise removed. The density modulated train of master pulses can then be demodulated by passing it through an integrating filter. Such a filter should pass freely the frequency band occupied by the composite signal, but should exclude the higher pulse frequencies.

A low-pass filter cutting off at about 2,000 kilocycles per second would, for example, be suitable, or a band pass filter adapted to pass the range of frequencies, 60 to 800 kilocycles per second.

The individual signals corresponding to the various channels are then recovered by the usual amplitude demodulating processes from the composite signal obtained from the output of the band pass filter, or low-pass filter.

It will be thus seen that the advantage of a high signal-to-noise ratio which results from the use of pulses for conveying the signals is obtained according to the invention without the difficulties associated with the introduction of cross-talk by the pulses. The cross-talk will be principally introduced in the amplitude modulating and demodulating stages, and this cross-talk can readily be reduced to negligible limits as is well known.

While for illustration the composite signal has been taken to include 200 channels, it is obvious that the principle of pulse density modulation could be employed when the composite signal includes more or less than 200 channels; such as 12 channels, which for example, may cover a band of say 10 to 60 kilocycles per second; or even only one channel.

The number of pulses per second generated by the master pulse generator should not be less than about five or six times the maximum frequency of the band to be transmitted, at least in the case of speech channels.

The invention according to its broadest aspect provides an electric pulse communication system in which the signals are conveyed by pulses of invariable form, which can be transmitted only at specified times, the signal variations being indicated by the variations in the density of the pulses which are transmitted.

Figure 3:
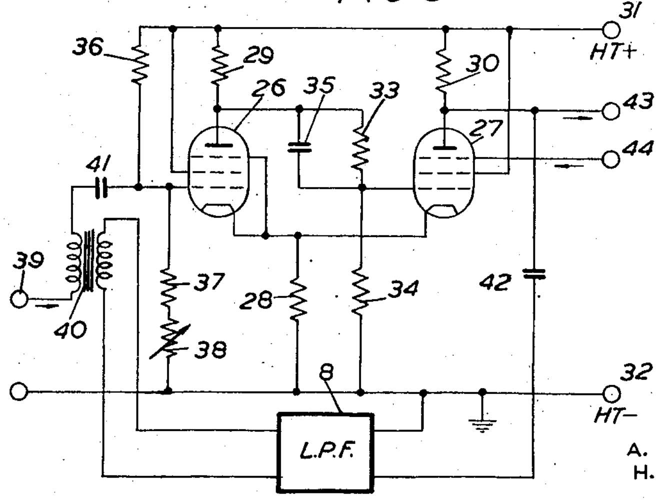

The invention will be described with reference to the accompanying drawing in which Figs. 1 and 2 respectively show block schematic circuit diagrams of a transmitter and a receiver for a system according to the invention, and Fig. 3 shows a schematic circuit diagram of the pulse density modulator employed in the transmitter.

In the transmitter, Fig. 1, a number of identical circuits are shown, each corresponding to one of the channels of the system. Actually four such circuits are shown, but there may be any number. In each circuit the corresponding signal is applied to terminal 1, and thence to an amplitude modulator 2 supplied with a carrier wave of appropriate frequency from an oscillator 3. The desired sideband is selected by a band pass filter 4 and delivered to a common conductor 5 to which all the other channel circuits are connected. The arrangement is such that the various channel signals are caused to occupy a number of corresponding adjacent frequency bands and so form a composite signal occupying a broad band. This modulating arrangement is well known and does not need detailed description.

The composite signal on conductor 5 is applied to a pulse density modulator 6 supplied with, say, 4 million pulses per second from a pulse generator 7 of any convenient type, such pulses each having a duration of, for example, $\frac{1}{10}$ or $\frac{1}{15}$ microsecond.

Part of the output of the density modulator 6 is fed back to the input through a low pass filter 8 (or other suitable smoothing circuit) designed to remove the pulse frequencies, and to give an output voltage proportional to the density of the output pulses. Details of the arrangement of elements 6 and 8 are given in Fig. 3.

The density modulated pulses at the output of the modulator 6 are passed through a high frequency amplifier 9 to a conventional high frequency modulator 10, where they are applied to amplitude modulate a high frequency carrier wave supplied by an oscillator 11. The pulse modulated waves are radiated by an antenna 12.

At the receiver, Fig. 2 the modulated carrier wave is received on an antenna 13 and passed through a conventional frequency changer 14 supplied with a carrier wave of appropriate frequency from an oscillator 15 in order to produce a pulse modulated wave of suitable intermediate frequency, which is passed through an amplifier 16 to a suitable detector 17 which recovers the density modulated pulses.

Part of the output of the detector is used to synchronise an oscillator 18 generating a frequency of 4 million cycles per second the output of which controls in turn a master pulse generator 19 adapted to produce 4 million master pulses per second, each of which has a duration less than that of the received pulses, for example, $\frac{1}{20}$ microsecond.

The received pulses at the output of the detector 17 are applied as gating pulses to a conventional gate circuit 20 to which also are applied the master pulses from the generator 19. The gating circuit 20 should be designed to pass a master pulse to the low pass filter 21 only when a gating pulse is received from the detector 17. It will thus be seen that the pulses supplied to the low pass filter 21 will correspond exactly in density to the received pulses, but will be entirely free from any distorting or interfering effects.

The average energy per second conveyed by the density modulated pulses varies with the signal voltage in just the same way as in the case of duration modulated pulses, and the low pass filter 21 therefore recovers the composite signal in the same way as for duration modulated pulses.

This filter should be designed to cut off just above the maximum frequency of the band occupied by the composite signal.

The recovered composite signal is delivered to a conductor to which are connected a number of conventional amplitude demodulating circuits corresponding to the respective channels of the system. Each circuit includes a bandpass filter 22, and a demodulator 23 supplied from an oscillator 24. The recovered signals are obtained from a terminal 25.

The pulse density modulator 6 of Fig. 1 is shown in detail in Fig. 3. It comprises two valves 26 and 27 arranged in a conventional manner to form a so-called "flip-flop" multivibrator. The valves share a common cathode resistance 28, and the anodes are connected through resistances 29 and 30 to the positive terminal 31 for the high tension source (not shown), the negative terminal 32 of which is preferably grounded as indicated. The screen grids are connected directly to terminal 31, and the suppressor grid of the valve 26 is connected to the cathode.

The anode of the valve 26 is connected through a resistance 33 to the control grid of the valve 27 without any intervening condenser, and this control grid is connected through a resistance 34 to ground. A condenser 35 shunts the resistance 33.

The control grid of the valve 26 is connected to terminal 31 through a resistance 36, and to ground through a fixed resistance 37 and a variable resistance 38. These resistances are used for determining the potential of this control grid, as will be explained later.

An input terminal 39 for the conductor 5 (Fig. 1) to which is supplied the composite signal, is connected through the secondary winding of a transformer 40 and a blocking condenser 41 to the control grid of the valve 26. The primary winding of this transformer is connected to the output of the low pass filter 8 the input of which is connected through a blocking condenser 42 to the anode of the valve 27. This anode is also connected to an output terminal 43 which will be connected to the amplifier 9 of Fig. 1. The suppressor grid of the valve 27 is connected to an input terminal 44 to which the pulse generator 7 of Fig. 1 will be connected.

The multivibrator circuit is so arranged that when the potential of the control grid of the valve 26 is below a certain critical value, this valve will be cut off, and the valve 27 will be conducting.

When the potential of this control grid rises above the critical value, the multivibrator will assume the other condition with the valve 27 cut off. The potential of the control grid of the valve 26 should be adjusted to a value at or slightly below the critical potential so that when no signals are applied at either of the terminals 39 or 44, the multivibrator is in the first condition with the valve 27 conducting. This valve will therefore be in a condition to produce an output pulse at terminal 43 in response to an input pulse applied at terminal 44.

The windings of the transformer 40 should be so poled that the output pulse which will be transmitted through the low pass filter 8 appears in positive sense on the control grid of the valve 26 thus switching the multivibrator over to the second condition with the valve 27 cut off. No further output pulses can now be produced until the multivibrator reverts to the first condition.

The effect of the low pass filter will be to round off and lengthen the output pulse so that, in particular, its trailing edge will be caused to slope away more or less slowly, instead of being substantially vertical. The time at which the control grid of the valve 26 again falls below the critical voltage will therefore be delayed. In the absence of any signal voltage applied to terminal 39, therefore, the multivibrator may be caused to remain in the second condition for one or more periods of the input pulses at terminal 46. This means that one or more of the input pulses will be missed out, and only every second or every third pulse, for example, will appear at the output terminal 43.

Now when a signal potential is applied to terminal 39, it will be clear that if it is positive, the time at which the potential of the control grid of the valve 26 falls below the critical value will be still further delayed and more pulses will be missed out. On the other hand, however, if the signal potential is negative, the control grid of the valve 26 will reach the critical value sooner, and fewer pulses will be missed out. It will be easily understood, therefore, that the number of pulses per second obtained at terminal 43, or in other words, the density of the pulses, will depend on the signal potential.

The low-pass filter 8 may be replaced by any suitable pulse shaping network which will produce a suitable delay in the recovery of the multivibrator. This delay may, for example, be such that in the absence of signals applied at terminal 39, alternate pulses are missed out.

It will be evident that the arrangements at the transmitter or receiver for forming or breaking down the composite signal may be modified, if desired, to include one or more stages of group modulation or demodulation as will be understood by those skilled in the art.

What is claimed is:

1. A multichannel pulse communicating system comprising a plurality of signal sources, means for modulating each of a plurality of adjacent frequency bands with a separate one of the signals from said signal sources, a pulse generator, a pulse number modulator coupled to the output of said generator, means for simultaneously applying all the signal modulated frequency band waves to said pulse number modulator to number modulate the pulses from said generator in accordance with said wave and means for transmitting the modulated pulses.

2. A system according to claim 1, further including a receiver having means at the receiver for recovering said signals comprising means for generating a train of auxiliary pulses regularly repeated at the same frequency as the pulses generated at the transmitter, but with shorter pulse duration, means for applying the train of auxiliary pulses to a gating circuit, means for applying the received number modulated pulses as gating pulses to the said gating circuit in such manner as to select only those auxiliary pulses which coincide respectively with received pulses, and means for passing the selected auxiliary pulses through a demodulating low pass filter.

3. A multichannel pulse communicating system comprising a plurality of signal sources, a modulating means connected to each of said signal sources for amplitude modulating waves in each of a plurality of adjacent frequency bands with the signals from one of said sources, a pulse generator for generating pulses having a fixed duration and amplitude, a pulse number modulator coupled to said pulse generator, means for combining and simultaneously applying all the signal modulated waves to said pulse number modulator to number modulate said pulses in accordance with the amplitude of said combined waves, a source of carrier waves, and means for modulating said carrier waves with said modulated pulses.

ARTHUR TISSO STARR.
HARRY GRAYSON.

References Cited in the file of this patent

UNITED STATES PATENTS

| Number | Name | Date |
|---|---|---|
| 1,548,260 | Espenschied | Aug. 4, 1925 |
| 1,910,977 | Weis | May 23, 1933 |
| 2,263,369 | Skillman | Nov. 18, 1941 |
| 2,272,070 | Reeves | Feb. 3, 1942 |
| 2,326,515 | Bartelink | Aug. 10, 1943 |
| 2,403,210 | Butement | July 2, 1946 |
| 2,430,139 | Peterson | Nov. 4, 1947 |
| 2,437,970 | Reich | Mar. 16, 1948 |
| 2,438,902 | Deloraine | Apr. 6, 1948 |
| 2,438,903 | Deloraine et al. | Apr. 6, 1948 |
| 2,438,950 | Smith | Apr. 6, 1948 |
| 2,481,516 | Jacobsen | Sept. 13, 1949 |
| 2,559,644 | Landon | July 10, 1951 |